United States Patent [19]

Zerfass et al.

[11] Patent Number: 5,001,007

[45] Date of Patent: Mar. 19, 1991

[54] SOFT MATERIAL GASKET AND METHOD OF MANUFACTURE

[75] Inventors: Hans-Rainer Zerfass, Burscheid; Franz-Josef Giesen, Odenthal, both of Fed. Rep. of Germany

[73] Assignee: Goetze AG, Fed. Rep. of Germany

[21] Appl. No.: 375,687

[22] Filed: Jul. 5, 1989

Related U.S. Application Data

[63] Continuation of Ser. No. 134,871, Dec. 18, 1987, abandoned.

[30] Foreign Application Priority Data

Dec. 20, 1986 [DE] Fed. Rep. of Germany ....... 3643743

[51] Int. Cl.$^5$ ................................................. B32B 5/16
[52] U.S. Cl. ................................. 428/328; 277/235 B; 277/DIG. 6; 427/302; 427/303; 427/387; 428/137; 428/447; 428/698
[58] Field of Search ...................... 427/302, 303, 387; 728/137, 328, 323, 443, 496, 698, 447; 277/228, DIG. 6, 235 B

[56] References Cited

U.S. PATENT DOCUMENTS

| | | | |
|---|---|---|---|
| 3,708,324 | 1/1973 | Stebleton | 427/302 |
| 3,749,593 | 7/1973 | Keiser | 427/302 |
| 3,970,322 | 7/1976 | Stecher et al. | 277/235 |
| 4,220,342 | 9/1980 | Shah | 277/228 |
| 4,483,539 | 11/1984 | Bindel et al. | 277/1 |
| 4,499,135 | 2/1985 | Mitchell et al. | 427/137 |
| 4,500,100 | 2/1985 | Bindel | 227/235 |

FOREIGN PATENT DOCUMENTS

| | | | |
|---|---|---|---|
| 39200 | 8/1964 | Fed. Rep. of Germany | 427/302 |
| 138490 | 11/1979 | Fed. Rep. of Germany | 427/302 |

*Primary Examiner*—Janyce Bell
*Attorney, Agent, or Firm*—Spencer & Frank

[57] ABSTRACT

Soft material flat gasket useful as an exhaust flange gasket, a cylinder head gasket or a secondary gasket for internal-combustion engines includes a porous soft material and a crosslinked impregnating agent included in the porous soft material. The crosslinked impregnating agent is comprised of a silicone resin and is the crosslinked product of at least one liquid polysiloxane having reactive hydrogen groups. Crosslinking of the at least one liquid polysiloxane proceeds in the presence of an effective amount of a catalyst, which catalyst is introduced into the porous soft material prior to introduction therein of the at least one liquid polysiloxane according to the inventive method of manufacture. Introduction of catalyst prior to polysiloxane impregnation results in the catalyst being finely distributed throughout the soft material so that subsequent crosslinking of the impregnating agent results in products that are saturated to such a degree that the impregnating agents crosslink substantially in the surface regions and the finished gaskets no longer stick to packaging material used in storage, shipping and handling, or cling to sealing faces of, for example, internal-combustion engines, after installation.

26 Claims, No Drawings

SOFT MATERIAL GASKET AND METHOD OF MANUFACTURE

This application is a continuation of application Ser. No. 134,871, filed Dec. 18, 1987, now abandoned.

BACKGROUND OF THE INVENTION

1. Field of the Invention

The present invention relates to a flat gasket made of a soft material, which gasket is useful as an exhaust flange gasket, a cylinder head gasket or a secondary gasket for internal-combustion engines, and is composed of a porous soft material, optionally containing fillers and binders, which porous soft material is impregnated by a liquid silicone resin and is crosslinked in the gasket when it is ready to be installed.

2. Description of the Related Art

In practice, soft material cylinder head gas kets are usually composed of fiber web materials which are optionally reinforced with metal. While asbestos fibers were used previously as a fiber web material, at present it is preferable to use fiber webs which are more or less free of asbestos and are generally mixtures of fibers of organic or inorganic and synthetic or natural origin and sealing agent components and, optionally, fillers.

Graphite gaskets have been put to use as asbestos-free cylinder head gasket materials. These prior art graphite gaskets are composed of graphite sheet and sheet metal laminates or of metal plates onto which graphite has been pressed and which, optionally, also contain binders, that is graphite binder sheets. However, pure graphite gaskets have the drawback that they cling to the sealing faces of the internal-combustion engine.

Soft material cylinder head gaskets for internal-combustion engines generally are impregnated, primarily to improve their service life, sealing quality and strength. According to U.S. Pat. No. 3,970,322, useful impregnating agents are composed of crosslinkable liquid organic-synthetic substances which are thermally crosslinked in the gasket when it is ready to be installed.

Liquid silicone resin systems are known which preferably crosslink catalytically when metal salts are added. Such silicone resin systems have been used to impregnate soft substance gaskets and, because of their excellent technological characteristics, these gaskets exhibit a particularly good resistance to the media to be sealed, to temperature influences and to aging.

According to German Published Application DE-OS No. 3,245,664, which corresponds to U.S. Pat. No. 4,499,135, a polymethyl vinyl siloxane resin is used as the liquid silicone resin which crosslinks with platinum complex salts during polyaddition. This crosslinking system, however, is sensitive to amine compounds which act to poison the catalyst and to sulfur-discharging compounds so that sulfur-free and amine-free sealing plates must be used. However, due to the nature of the rubber binders generally used in sealing materials, production of sealing plates which are free of amines and sulfur-discharging compounds is possible only at great expense.

According to German Published Application DE-OS No. 3,317,501, which corresponds to U.S. Pat. Nos. 4,483,539 and 4,500,100, liquid polysiloxanes having crosslinkable hydrogen groups, such as methyl hydrogen polysiloxanes, are used to impregnate gasket preforms. Organic heavy metal salts are added as crosslinking catalysts. After crosslinking, however, such impregnated gaskets still contain reactive hydrogen groups from the polysiloxane, particularly in the surface regions thereof, so that, during storage and transport, the gaskets very disadvantageously stick to the packaging material and, after installation, to the sealing faces of the internal-combustion engines. These gaskets are therefore generally additionally coated with a condensation crosslinking polysiloxane resin and, once the coating has crosslinked, such gaskets no longer cling, but the process of manufacturing such gaskets is complicated and expensive and, thus, uneconomical.

SUMMARY OF THE INVENTION

It is therefore an object of the present invention to provide a soft material flat gasket containing a polysiloxane impregnate which, after crosslinking of the polysiloxane impregnating agent, does not exhibit any disadvantageous sticking or clinging characteristics and which can be manufactured easily and cost effectively and, thus, economically.

The object of the present invention is accomplished by providing a soft material flat gasket including a porous soft material and a crosslinked impregnating agent included in the porous soft material, which crosslinked impregnating agent is comprised of a silicone resin. The crosslinked impregnating agent is the crosslinked product of at least one liquid polysiloxane having reactive hydrogen groups and crosslinking of the at least one liquid polysiloxane proceeds in the presence of an effective amount of a catalyst, which catalyst is introduced into the porous soft material prior to introduction therein of the at least one liquid polysiloxane.

The object of the present invention is further accomplished by providing a method of manufacturing a soft material flat gasket impregnated with a silicone resin which does not exhibit disadvantageous sticking or clinging characteristics and is useful as an exhaust flange gasket, a cylinder head gasket or a secondary gasket for internal combustion engines. The method includes introducing a catalyst into the porous soft material in an amount effective to crosslink an impregnating agent, which impregnating agent is subsequently introduced, to provide a catalyst-pretreated porous soft material. The catalyst-pretreated soft material is impregnated with the impregnating agent, which impregnating agent comprises at least one liquid polysiloxane having respective hydrogen groups, to provide an impregnated and catalyst-pretreated porous soft material. The impregnated and catalyst-pretreated porous soft material is then treated to cause crosslinking of the impregnating agent.

The present invention thus provides a soft material flat gasket useful as an exhaust flange gasket, a cylinder head gasket or a secondary gasket for internal combustion engines, which includes a porous soft material and a crosslinked impregnating agent, which crosslinked impregnating agent is comprised of a silicone resin. The gasket is prepared by a process comprising introducing a catalyst into the porous soft material in an amount effective to crosslink an impregnating agent, which impregnating agent is subsequently introduced, to provide a catalyst-pretreated porous soft material. The catalyst-pretreated porous soft material is impregnated with the impregnating agent, which impregnating agent comprises at least one liquid polysiloxane having reactive hydrogen groups, to provide an impregnated and catalyst-pretreated porous soft material. The impregnated and catalyst-pretreated soft material is then treated to cause crosslinking of the impregnating agent.

Surprisingly, it was found that finished gaskets according to the invention no longer disadvantageously stick or cling to surfaces contacted and are fully usable in that form. Sticking to packaging material was no longer observed and clinging to sealing faces of internal-combustion engines was substantially avoided. It appears that the catalyst compounds, when introduced into the soft material before the polysiloxane impregnation, are precipitated onto the fibrous soft material as a finely distributed precipitate which is fine-grained to powdery and, thus, develop a special surface activity. The subsequent crosslinking of the impregnating agent thus results in products that are saturated with crosslinking agent to such a degree that the impregnating agent crosslinks substantially in the surface regions and the finished gaskets containing the crosslinked impregnating agent no longer stick or cling to surfaces which they contact.

Preferably, water-insoluble heavy metal salts of organic acids, i.e., organometallic salts, are employed as catalysts in which the heavy metals are preferably selected from iron, tin, zinc, cobalt, lead, aluminum, titanium and/or zirconium and which are bound with organic acids to form stearates, octoates, mercaptides or maleinates. The preferred amount of catalyst ranges from about 0.5 to about 5 percent by weight based on the weight of soft material. To prevent the catalyst from dissolving out of the soft material during polysiloxane impregnation, such as by immersion in a bath of the impregnating agent, the organic heavy metal salts employed as catalysts should be insoluble in the impregnating agent employed. In this way, the surface regions of the gaskets still retain sufficient crosslinking catalyst so that the impregnating agent crosslinks in an optimum manner in the surface regions, as well as in the internal regions of the gasket, and no longer clings. At the same time, the impregnating agent bath remains free of dissolved catalyst and retains an advantageously long processibility time.

It was also found that, for optimum crosslinking of the impregnating agent in the gasket, the gasket should additionally contain at least one filler selected from metal oxides whose respective metals correspond to metals present in the organometallic salt or salts which comprise the catalyst. The filler is preferably in active, powdered to fine-grained form. Zinc, titanium and/or zirconium organometallic salts are preferably employed as catalysts and then, for example, the soft material may advantageously contain from a finite amount up to 30 weight percent of active zinc oxide, titanium dioxide or zirconium dioxide.

The catalyst may be added to the soft material during or after manufacture of the soft material. If a soft material fiber web is produced from a suspension of fibers, the catalyst may be added to the suspension of fibers. If the soft material for the gaskets are selected from pressed plastic fiber substances or graphite or graphite-binder mixtures, the catalyst may be added to the plastic fiber substances or to the graphite or graphite-binder mixtures prior to or after pressing thereof to form a sheet of soft material. In principle, the finished soft material sheets may also be impregnated with solutions or dispersions of the organometallic salt catalyst before polysiloxane impregnation.

Thus, the present invention makes it possible, in a simple and economical manner, to produce finished, soft material flat gaskets which are impregnated with crosslinked silicone resins, whose surface regions do not stick or cling to packing material used in storage, shipping and handling, and do not stick or cling to sealing faces contacted upon installation, and which, at the same time, exhibit the advantageous, improved mechanical characteristics of a silicone impregnate primarily with respect to resistance and strength values.

Graphite gaskets, in particular, can be successfully impregnated in this manner. Graphite gaskets without impregnate have poor mechanical stability so that breaks may occur when they are processed and such non-impregnated gaskets cling in a disadvantageous manner to the sealing faces of internal-combustion engines contacted upon installation, particularly when removal thereof is desired. The present impregnate and method make graphite gaskets sufficiently strong so that they can be processed without the danger of damage and, at the same time, clinging to the sealing faces of internal-combustion engines after installation is substantially avoided.

The preferred silicone impregnating agent is composed of a polymethyl hydrogen siloxane having a viscosity ranging from about 5 to about 20 mPa.S and the impregnation of the soft material of the soft material flat gasket may be effected before or after openings, suitable for the specific gasket design, are cut out; before or after they are combined with a metal reinforcing plate; or before or after the openings are reinforced along their peripheral edges. Preferably the impregnation takes place by short-term immersion in a bath of the impregnating agent. Crosslinking of the impregnating agent is then effected, such as by briefly heating the impregnated soft material gasket preform in a furnace at about 150° to 250° C.

If necessary for particular applications, finished gaskets according to the invention may also be provided with conventional coatings of, for example, polymeric materials. No adhesion problems have been observed for the coatings and coverings at the gasket surface.

DESCRIPTION OF THE PREFERRED EMBODIMENTS

The invention will now be described in greater detail with reference to embodiments thereof.

EXAMPLE 1

Fiber webs were produced from suspensions of fibers by combining the following ingredients:

15 to 40 parts by weight of a mixture of organic and inorganic fibers;

20 to 50 parts by weight of pyrogenic silicic acid;

5 to 30 parts by weight titanium dioxide;

0 to 5 parts by weight active zinc oxide;

1 to 5 parts by weight zinc stearate as catalyst; and 3 to parts by weight latex binder, based on nitrile butadiene rubber.

Due to the fact that the zinc stearate of the suspension is added during the production of the fiber web, the zinc stearate is deposited on the fibers and the metal oxide fillers in a finely dispersed manner. The fiber webs were rolled onto both sides of a rough metal sheet and were processed into cylinder head gaskets having thicknesses of 3 mm.

EXAMPLE 2

Graphite sheets of expanded graphite which contained from 0.5 to 5 weight percent zinc stearate, added during the production of the sheets and present in a finely distributed form, were rolled onto both sides of a rough metal sheet in such a manner that the graphite sheets had 70% of theoretical density. The cylinder head gaskets produced from the rolled sheet material had thicknesses of about 3 mm.

The gaskets of Examples 1 and 2 were impregnated with liquid polymethyl hydrogen siloxane having a viscosity of 15 mPa.S by immersion for 2 minutes in a bath thereof to produce a pore fill of 90%. The impregnating agent was crosslinked in a furnace for 2½ minutes at 230° C.

Sealing behavior, flow behavior and adhesion behavior of the impregnated gaskets were determined in an engine test.

No worsening of the operational characteristics of the gaskets was observed, even after longer periods of storage and use.

The present disclosure relates to the subject matter disclosed in Federal Republic of Germany Patent Application No. P 36 43 743.3, filed Dec. 20th, 1986, the entire specification of which is incorporated herein by reference.

It will be understood that the above description of the present invention is susceptible to various modifications, changes and adaptations, and the same are intended to be comprehended within the meaning and range of equivalents of the appended claims.

We claim:

1. A soft material flat gasket useful as an exhaust flange gasket, a cylinder head gasket or a secondary gasket for internal-combustion engines, the soft material flat gasket comprising:
   a porous soft material;
   a catalyst which is uniformly included in the porous soft material so as to be evenly distributed therein;
   at least one filter selected from among metal oxides whose respective metal corresponds to a metal present in the catalyst; and
   an impregnating agent included in the porous soft material, which impregnating agent is comprised of a crosslinked silicone resin in the finished soft material flat gasket, but which crosslinked silicone resin is comprised of at least one liquid polysiloxane having reactive hydrogen groups before crosslinking,
   wherein the catalyst is substantially insoluble in the impregnating agent.

2. The soft material flat gasket according to claim 1, wherein the porous soft material contains from about 0.5 to about 5 weight percent catalyst.

3. The soft material flat gasket according to claim 1, wherein the catalyst is insoluble in water and in the at least one liquid polysiloxane.

4. The soft material flat gasket according to claim 1, wherein the catalyst is comprised of at least one organometallic salt.

5. The soft material flat gasket according to claim 4, wherein the at least one organometallic salt is selected from among stearates, octoates, mercaptides and maleinates of iron, tin, zinc, cobalt, lead, aluminum, zirconium and titanium.

6. The soft material flat gasket according to claim 1, further comprising at least one binder.

7. The soft material flat gasket according to claim 1, wherein the porous soft material is comprised of a fiber web which is manufactured from a suspension of fibers, which suspension additionally contains the catalyst.

8. The soft material flat gasket according to claim 7, wherein the porous soft material further comprises at least one binder.

9. The soft material flat gasket according to claim 1, wherein the porous soft material is comptised of a graphite sheet comprising graphite and the catalyst.

10. The soft material flat gasket according to claim 9, wherein the graphite sheet further comprises at least one binder.

11. The soft material flat gasket according to claim 1, wherein the catalyst is introduced into the porous soft material as one of a solution and a dispersion of the catalyst.

12. The soft material flat gasket according to claim 1, wherein the at least one liquid polysiloxane is a polyhydrogen methyl siloxane having a viscosity ranging from about 5 to about 20 mPa.S.

13. A soft material flat gasket useful as an exhaust flange gasket, a cylinder head gasket or a secondary gasket for internal combustion engines, and comprised of:
   a porous soft material;
   a catalyst uniformly included in the porous soft material;
   at least one filler selected from among metal oxides whose respective metal corresponds to a metal present in the catalyst; and
   an impregnating agent included in the porous soft material, which impregnating agent is comprised of a crosslinked silicone resin in the finished soft material flat gasket, but which crosslinked silicone resin is comprised of at least one liquid polysiloxane having reactive hydrogen groups before crosslinking, and wherein the catalyst is insoluble in the impregnating agent, the soft material flat gasket being prepared by a process comprising:
   a. introducing the catalyst uniformly into the porous soft material prior to introduction of the impregnating agent therein and in an amount effective to crosslink the at least one liquid polysiloxane to provide a catalyst-pretreated porous soft material;
   b. impregnating the catalyst-pretreated porous soft material with the impregnating agent in a single impregnating step to provide an impregnated and catalyst-pretreated porous soft material; and
   c. treating the impregnated and catalyst-pretreated porous soft material to cause crosslinking of the at least one liquid polysiloxane and provide the soft material flat gasket.

14. The soft material flat gasket according to claim 13, wherein from about 0.5 to about 5 weight percent catalyst is introduced into the porous soft material.

15. The soft material flat gasket according to claim 13, wherein the catalyst is insoluble in water and in the at least one liquid polysiloxane.

16. The soft material flat gasket according to claim 13, wherein the catalyst is comprised of at least one organometallic salt.

17. The soft material flat gasket according to claim 16, wherein the at least one organometallic salt is selected from among stearates, octoates, mercaptides and maleinates of iron, tin, zinc, cobalt, lead, aluminum, zirconium and titanium.

18. The soft material flat gasket according to claim 13, further comprising at least one binder.

19. The soft material flat gasket according to claim 13, wherein the porous soft material is comprised of a fiber web which is manufactured from a suspension of fibers and wherein the catalyst is introduced into the porous soft material by adding the catalyst to the suspension of fibers.

20. The soft material flat gasket according to claim 19, wherein the porous soft material further comprises at least one binder.

21. The soft material flat gasket according to claim 13, wherein the porous soft material is comprised of a graphite sheet comprising graphite and wherein the catalyst is introduced into the porous soft material by including the catalyst in the graphite sheet.

22. The soft material flat gasket according to claim 21, wherein the graphite sheet further comprises at least one binder.

23. The soft material flat gasket according to claim 13, wherein the catalyst is introduced into the porous soft material as one of a solution and a dispersion of the catalyst.

24. The soft material flat gasket according to claim 13, the at least one liquid polysiloxane is a polyhydrogen methyl siloxane having a viscosity ranging from about 5 to about 20 mPa.S.

25. A method of manufacturing a soft material flat gasket impregnated with a crosslinked silicone resin which does not exhibit disadvantageous sticking or clinging characteristics and is useful as an exhaust flange gasket, a cylinder head gasket or a secondary gasket for internal combustion engines, the method comprising:

a. admixing into a porous soft material at least one filler selected from among metal oxides whose respective metal corresponds to a metal present in a catalyst to be employed in the method;

b. introducing a catalyst uniformly into the porous soft material prior to introduction of an impregnating agent therein and in an amount effective to crosslink the impregnating agent to provide a catalyst-pretreated porous soft material, which catalyst is substantially insoluble in the impregnating agent;

c. impregnating the catalyst-pretreated porous soft material with the impregnating agent in a single impregnating step, which impregnating agent comprises at least one liquid polysiloxane having reactive hydrogen groups, to provide an impregnated and catalyst-pretreated porous soft material; and d. treating the impregnated and catalyst-pretreated porous soft material to cause crosslinking of the impregnating agent and provide the soft material flat gasket impregnated with a crosslinked silicone resin.

26. The method according to claim 25, comprising the further step of admixing at least one binder into the porous soft material of the soft material flat gasket.

* * * * *